US006657141B1

(12) United States Patent

Myojin

(10) Patent No.: US 6,657,141 B1
(45) Date of Patent: Dec. 2, 2003

(54) FOUR-WAY SLIDE SWITCH

(75) Inventor: Satoshi Myojin, Tokyo (JP)

(73) Assignee: Mitsuku Denshi Kogyo K.K., Tokyo (JP)

(*) Notice: Subject to any disclaimer, the term of this patent is extended or adjusted under 35 U.S.C. 154(b) by 0 days.

(21) Appl. No.: 10/292,178

(22) Filed: Nov. 12, 2002

(51) Int. Cl.[7] ............................................. H01M 25/04
(52) U.S. Cl. .......................................... 200/6 A; 200/4
(58) Field of Search ........................... 200/4, 5 R, 6 A, 200/17 R, 18, 335

(56) References Cited

U.S. PATENT DOCUMENTS 4,256,931 A * 3/1981 Palisek ....................... 200/5 A
4,280,027 A * 7/1981 Comerford et al. ......... 200/6 A
4,428,649 A * 1/1984 Main et al. ................. 359/876
4,470,320 A * 9/1984 Kim ........................... 200/6 A
5,698,825 A * 12/1997 Karasik ...................... 200/5 A
6,084,189 A * 7/2000 Menche et al. ............. 200/315
6,388,210 B1 * 5/2002 Nisse ......................... 200/6 A

* cited by examiner

*Primary Examiner*—Elvin Enad
*Assistant Examiner*—M. Fishman
(74) *Attorney, Agent, or Firm*—Quarles & Brady LLP

(57) ABSTRACT

An improved four-way switch is provided that can prevent erroneous switching operation. A closed circuit is formed by cooperatively tilting a control knob and a tiltable member in an intended direction or by depressing only the control knob, thus selectively providing electrical signals. The tiltable member, having contact spring units extended in four directions therefrom, and the control knob are disposed separately. The control knob is vertically engaged slidably into the square hole of the tiltable member. The protruded portions of the control knob are detachably engaged into the recessed portions of the tiltable member. When the center switch means is operated, only the control knob descends vertically and then restores. When the four-way switch means is operated, the tiltable member and the control knob operate in a linkage mode.

4 Claims, 17 Drawing Sheets

| CIRCUIT CONFIGURATION | |
|---|---|
| DIRECTION ① | A, E (COM) |
| DIRECTION ② | B, E (COM) |
| DIRECTION ③ | C, E (COM) |
| DIRECTION ④ | D, E (COM) |
| CENTER CLICKING | E (COM) |

FOUR-WAY SLIDE SWITCH

BACKGROUND OF THE INVENTION

1. Field of the Invention

The present invention relates to a four-way slide switch used for remote controls for various electronic appliances (such as TV sets and video equipment), portable telephones, and others.

2. Description of the Prior Art

Recently, multidirectional switches, which can arbitrarily select a large number of circuits, have been used for remote controls for various electronic appliances (such as TV sets and video equipment), portable telephones, and others. Particularly, four-way switches of the type have been broadly used, by which switching operations are performed by tilting a manipulation member in four (back, forth, right and left) directions and vertically descending it at the center (neutral) position.

FIG. 19 shows a conventional four-way switch. The four-way switch includes a stationary contact E', COM' formed on the center surface of the base substrate of an insulating case 100, stationary contacts A' and E', B' and E', C' and E', and D7 and E' (where E is a common contact) formed around of the center stationary contact and arranged at equal angle intervals in four directions (1), (2), (3) and (4), push-type switching means S' (center), S' 1, S' 2, S' 3, and S' 4 each formed of a diaphragm-type contact spring disc 111 placed to each stationary switch, and tilting members (not shown) such as discs, each having a depressing member mounted upward so as to confront each switching means.

When the tilting member is depressed downward from the center (neutral) position, the depressing member deforms the contact spring disc 111 of the switch means S' to bring the stationary contact E', COM' to an electrically conductive state (the switch is turned on). When the depression is released, the tilting member returns to its original position by the restoring force of the contact spring disc 111 (the switch is turned off).

When the tilting member is tilted from the center position toward one of the four directions (1), (2), (3) and (4), the corresponding depressing member deforms the contact spring disc 111 of one of switch means S' 1, S' 2, S' 3 and S' 4. Thus, stationary contacts, A' and E', B' and E', C' and E', or D' and E' are brought to an electrical conduction state (to turn on the switch). When the depression is released, the tilting member returns to its original position by the restoring force of the contact spring disc (to turn off the switch).

As described above, the conventional four-way switch uses five diaphragm-type contact spring discs, which are disposed at the center and in four directions. However, minute diaphragm-type contact spring discs with high precision are required and are expensive. Using five diaphragm-type contact spring discs leads to an increased cost of the switch. (For example, the case for a four-way switch has an external size of 10 mm in depth×10 mm in width×2 mm in height and the contact spring disc has a diameter of 3 mm to 4 mm).

Moreover, it is difficult to arrange the contact spring discs at the center and at positions in four directions accurately and stably. The contact spring disc is easily displaced by external shock.

When the tilting member is erroneously depressed in a slant direction, the center switch means may not be turned on accurately. Meanwhile, the switch means to be operated by only the oblique movement may be erroneously turned on.

SUMMARY OF THE INVENTION

The present invention is made to solve the above-mentioned problems.

An object of the invention is to provide an improved four-way switch wherein a closed circuit is formed by cooperatively tilting a control knob and a tiltable member in an intended direction or by depressing only the control knob, thus selectively providing electrical signals.

According to the present invention, the contact spring disc, which raises problems in cost and in switch design, is used only for the center switch means, which is easily mounted and maintained. Strip-like contact spring pieces, which can be designed and fabricated easily and at low cost, are used for the four-ways switch means.

Moreover, the tiltable member, having contact spring units extended in four directions therefrom, and the control knob are disposed separately. The control knob is vertically engaged slidably into the square hole of the tiltable member. The protruded portions of the control knob are detachably engaged into the recessed portions of the tiltable member. When the center switch means is operated, only the control knob descends vertically and then restores. When the four-way switch means is operated, the tiltable member and the control knob operate in a linkage mode. This switch structure can eliminate an erroneous operation, thus effectively solving the problems in the prior art.

According to an aspect of the present invention, a four-way switch comprises a tiltable body formed of an insulating plate having a square opening in the center thereof, the tiltable body having recessed portions on the lower inner side in the square opening; a contact resilient unit formed of a base portion of a conductive resilient plate from which return spring pieces and contact spring pieces are protruded out in parallel; a tiltable member in which contact resilient units are embedded, the tiltable member having four peripheral sides each from which a set of a return spring piece and contact spring pieces is protruded out, the center of the opening of the tiltable body and the center of each of four sides of the square opening being aligned with the center of the base portion of each contact resilient unit; a control knob having a shaft, protruded portions, a knob, and a bulge, the shaft being slidably inserted into the square opening of the tiltable member, the protruded portions being formed at the lower end of the shaft and being detachably engaged in the recessed portions of the tiltable body, the knob extending upward from the shaft, the bulge being protruded from the center of the lower end of the shaft; a contact spring disc inserted into the center of a case, the fringe of the contact spring disc being disposed so as to contact with stationary contacts formed on the upper surface of the case, the center portion of the contact spring disc confronting a center stationary contact formed on the upper surface of the case; wherein the shaft of the control knob is inserted into the opening in the tiltable member; the structure in which the protruded portions and the recessed portions are engaged to each other is disposed inside the case; the center of the bulge of the control knob is aligned with the center of the upper surface of the contact spring disc; the return spring pieces are respectively placed on spring rests formed inside the case; and the contact spring pieces are respectively disposed over stationary contacts on the upper surface so as to be spaced away from each other; and a cover plate for covering the upper opening of the case, the cover plate having a center hole therein, the knob of the control knob protruding upward from the center hole of the cover plate, the cover plate pressing the inner surface around the center hole against the peripheral portion of the tiltable body, with the return spring pieces biased.

When the knob of the control knob is tilted in an intended direction, the control knob and the tiltable member are tilted together against the restoring force of the return spring pieces of a corresponding resilient unit so that the ends of the contact spring pieces are electrically contacted with corresponding stationary contacts disposed on the upper surface of the base substrate of the case.

When tilt of the knob is released, the knob returns to its original position by a restoring force of the return spring pieces.

When the knob of the control knob is depressed, only the control knob slidably descends into the square opening of the tiltable member, so that the bulge of the control knob depresses the center portion of the contact spring disc and thus electrically connects the center portion thereof to the center stationary contact.

When the knob is released from its depression, the knob returns to its original position by a restoring force of the contact spring disc.

BRIEF DESCRIPTION OF THE INVENTION

This and other objects, features, and advantages of the present invention will become more apparent upon a reading of the following detailed description and drawings, in which.

DETAILED DESCRIPTION OF THE EMBODIMENT

Figure 1:
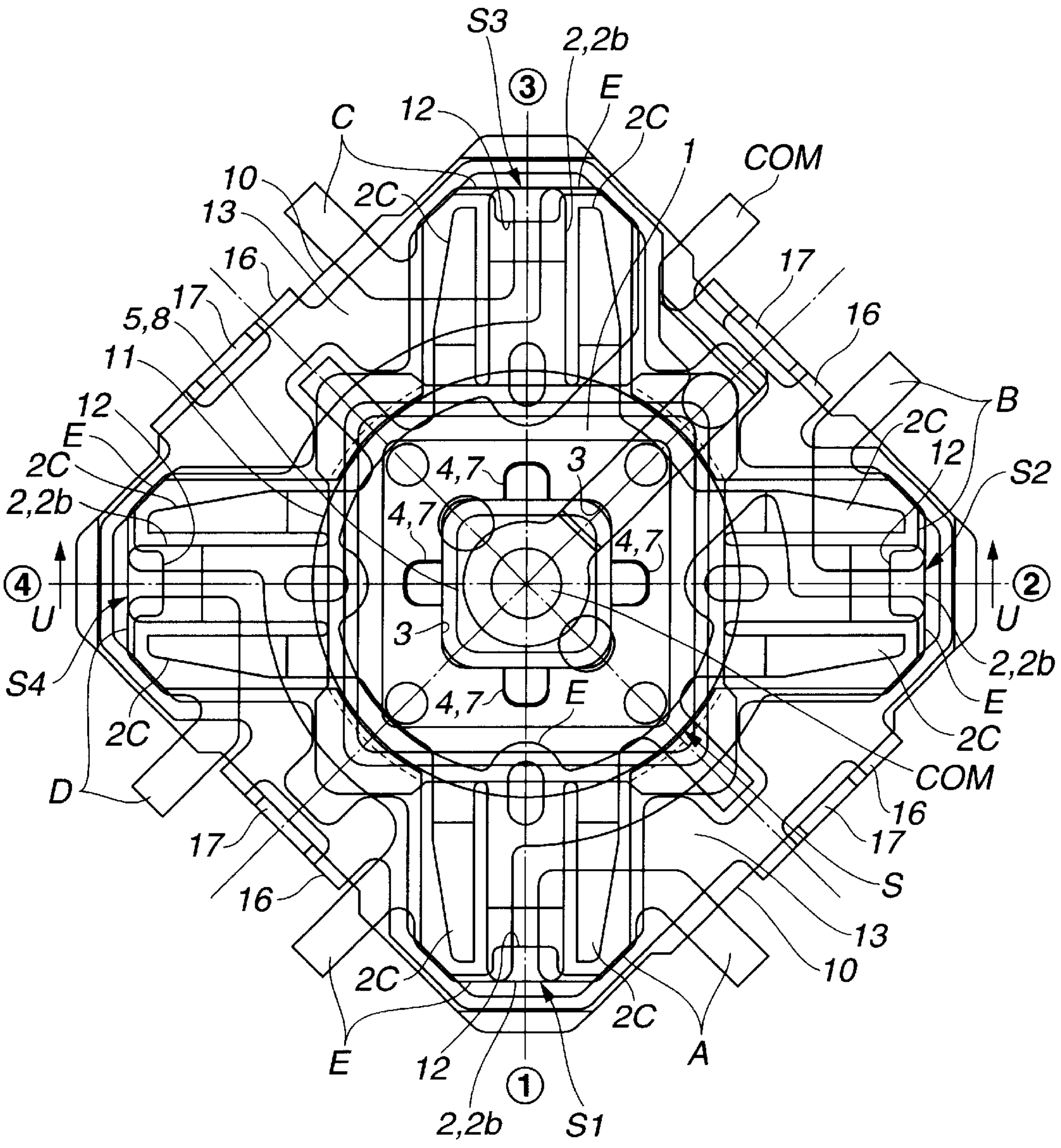
FIG. 1 is an enlarged plan perspective view schematically illustrating the structure of a four-way switch according to an embodiment of the present invention.

A four-way switch according to an embodiment of the present invention will be described below by referring to the attached drawings.

In the four-way switch, a tiltable member 1 includes an tiltable body la formed of an insulating square or circular plate and a contact resilient unit 2 formed of a conductive spring plate. The tiltable body la has a square opening 3 in the center thereof and has recessed portions at the lower ends of the inner surfaces of the square opening 3. The contact resilient unit 2 is formed of a base 2*a* of a conductive resilient plate from which return spring pieces 2*b* and contact spring pieces 2*c* are protruded out in parallel.

Referring to FIGS. 4 to 7, the center of the base portion 2*a* of each contact resilient unit 2 is aligned with the center of the square opening 3 of the tiltable body la and with the center of each of the four sides of the square opening 3. The virtual lines (1), (2), (3) and (4) pass through the centers of four sides of the square opening 3. The contact resilient units 2 are securely embedded in the tiltable member 1. In the tiltable member 1, a set of a return spring piece 2*b* and the contact spring pieces 2*c* is protruded out from each of the four peripheral sides of the tiltable body 1*a* at intervals of 90 degrees or in four directions (corresponding to the virtual lines (1), (2), (3) and (4)).

Figure 8:
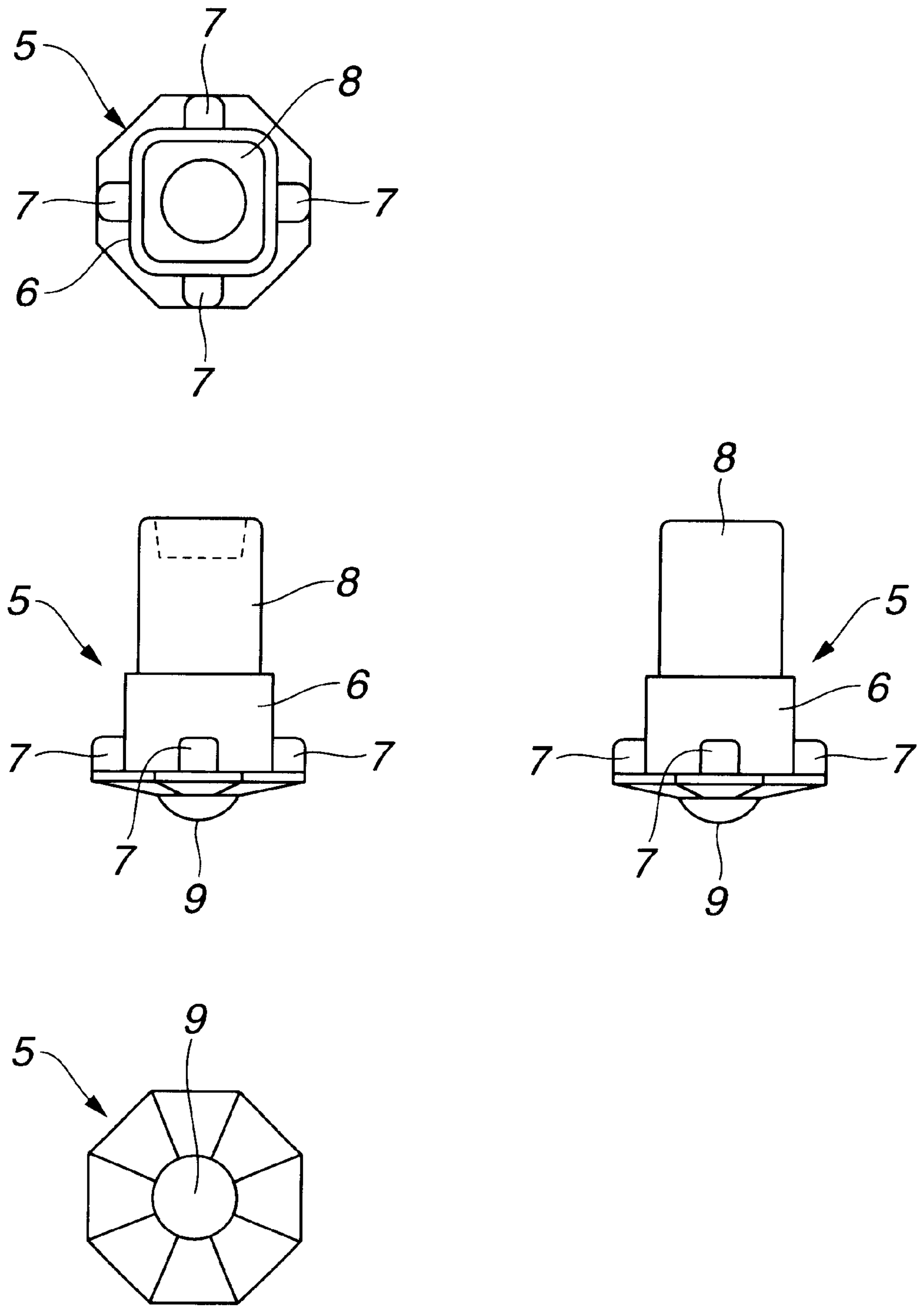
FIG. 8 is a front view of a control knob, including a plan view, a bottom view, and a right side view.

Referring to FIG. 8, a control knob 5 has a square shaft 6, protruded portions 7, a knob 8, and a bulge 9. The square shaft 6 is slidably inserted into the square opening 3 of the tiltable member 1. The protruded portions 7 are formed at the lower end of the outer side surface of the square shaft 6 to engage detachably in the recessed portion 4 in the square opening 3. The knob 8 extends upward from the square shaft 6. The bulge 9 protrudes from the center of the lower end of the square shaft 6.

Figure 9:
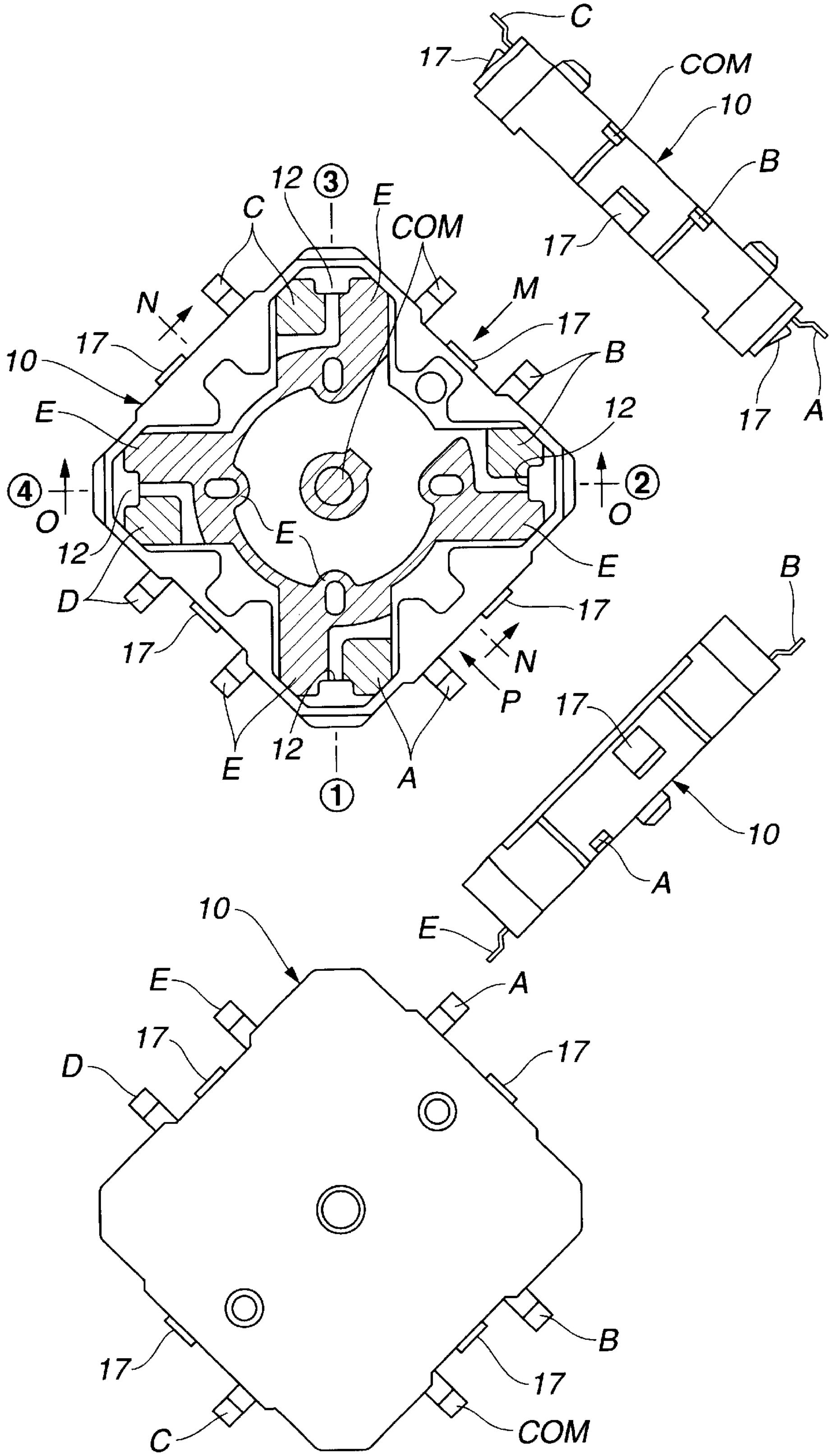
FIG. 9 is a plan view of a case, including a bottom view, a section viewed from arrow M, and a section viewed from arrow P.
Figure 10:
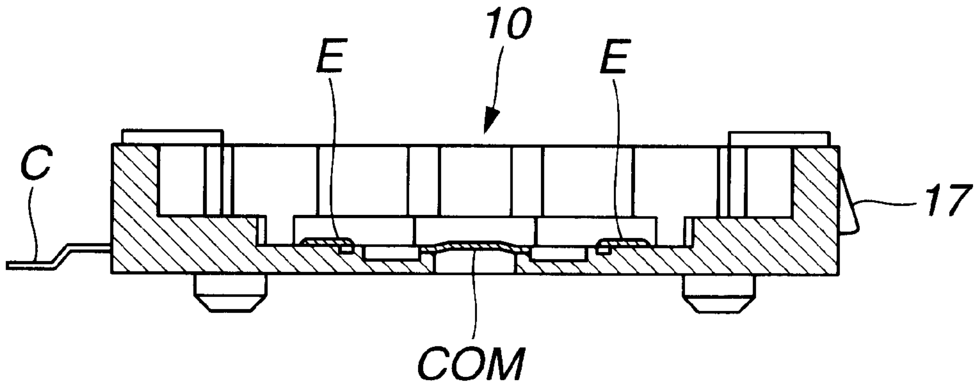
FIG. 10 is a fragmentary view illustrating the case taken along line N—N of FIG. 9.
Figure 11:
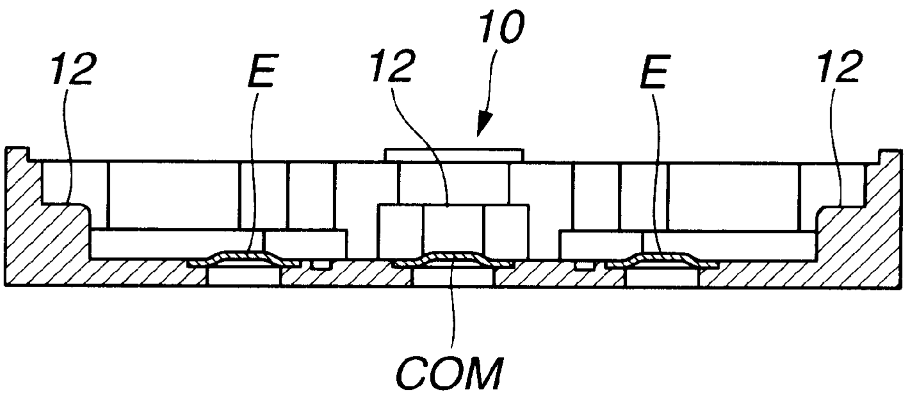
FIG. 11 is a fragmentary view illustrating the case taken along line O—O of FIG. 9.

A contact spring disc 11 is disposed to the center of a case 10 (shown in FIGS. 9 to 11). The fringe of the contact spring disc 11 is disposed so as to contact with stationary contacts E formed on the upper surface of the base substrate. The center portion of the contact spring disc confronts the center stationary contact COM formed on the upper surface of the base substrate. Thus, the center switch S is formed.

The square shaft 6 of the control knob 3 is inserted into the square opening 3 of the tiltable member 1. The intermediate structure in which the protruded portions 7 and the recessed portions 4 are engaged to each other. The assembled intermediate structure is disposed inside the case 10. The bulge 9 on the lower end of the control knob 5 is placed on the center of the upper surface of the contact spring disc 11. The return spring pieces 2*b* are respectively placed on the spring rests 12 formed inside said case 10. The contact spring pieces 2*c* (in the four directions shown with the virtual lines (1), (2), (3) and (4)) are respectively placed over stationary contacts AE, BE, CE and DE (where E is a common contact), each formed on the upper surface of the base substrate, so as to be spaced away from each other. Thus, switches S1, S2, S3 and S4 are formed.

Figure 2:
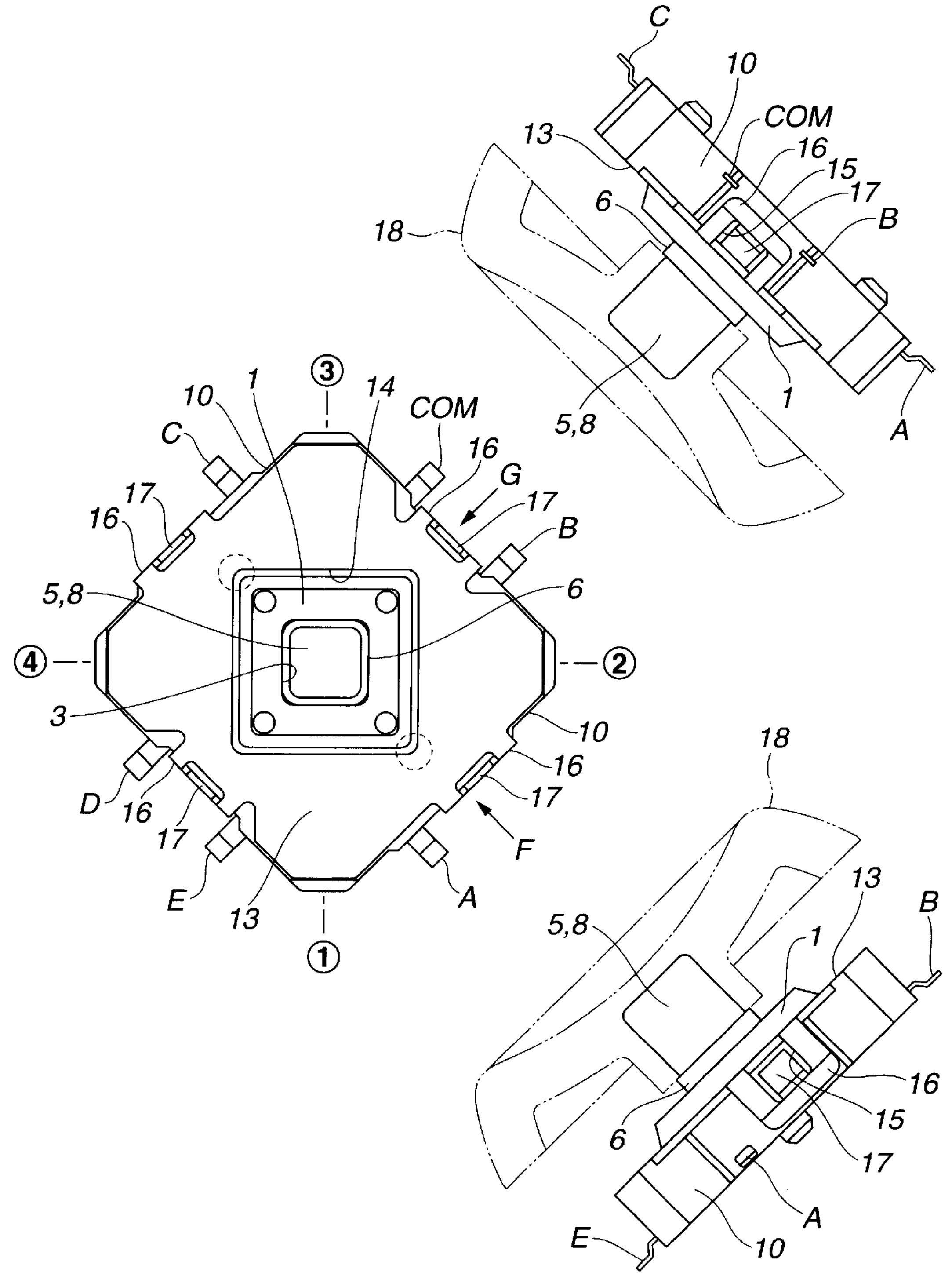
FIG. 2 is a plan view illustrating the four-way switch shown in FIG. 1, including a section viewed from arrow F and a section viewed from arrow G.
Figure 3:
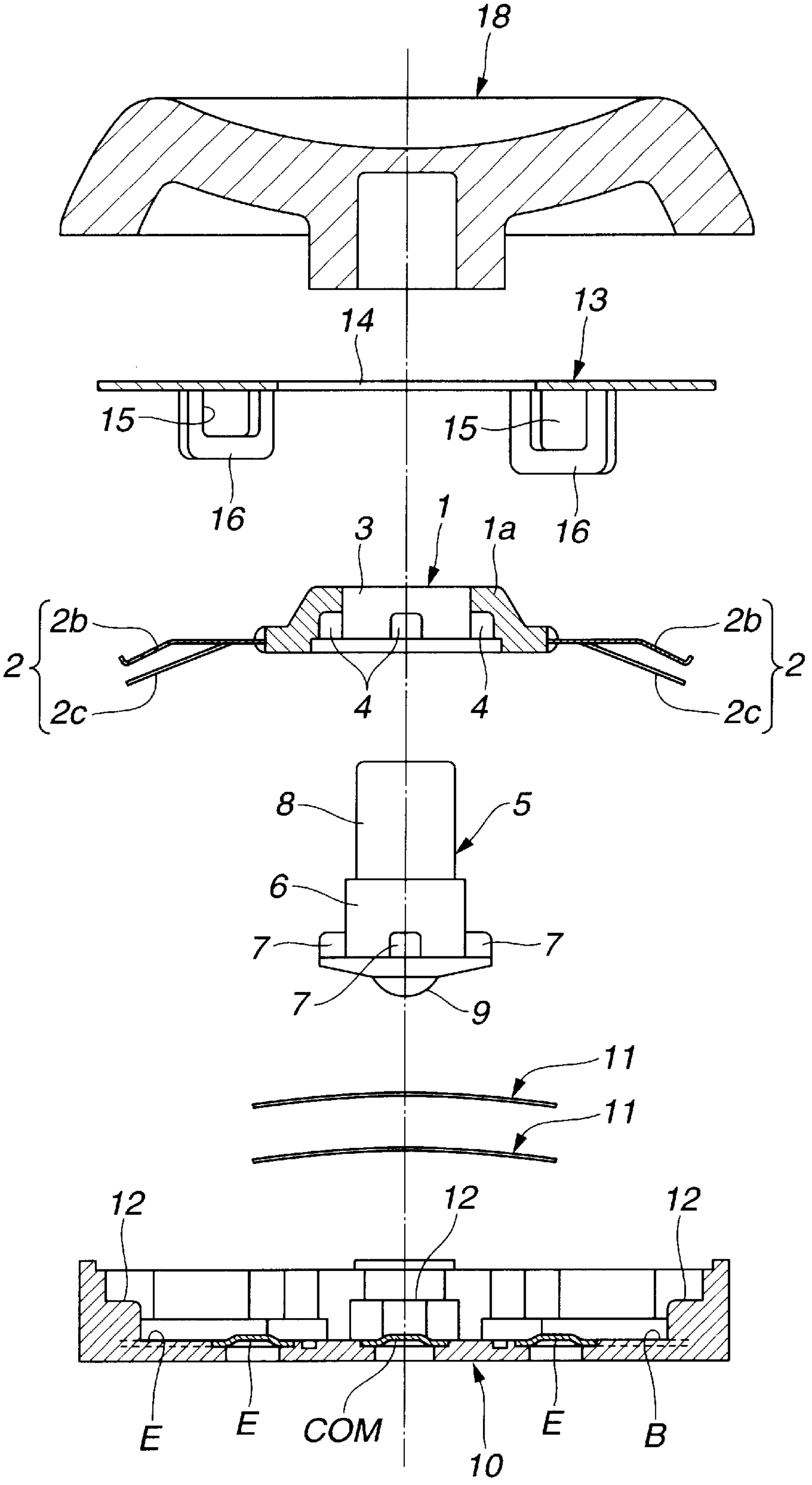
FIG. 3 is a disassembly diagram of the four-way switch shown in FIGS. 1 and 2.
Figure 4:
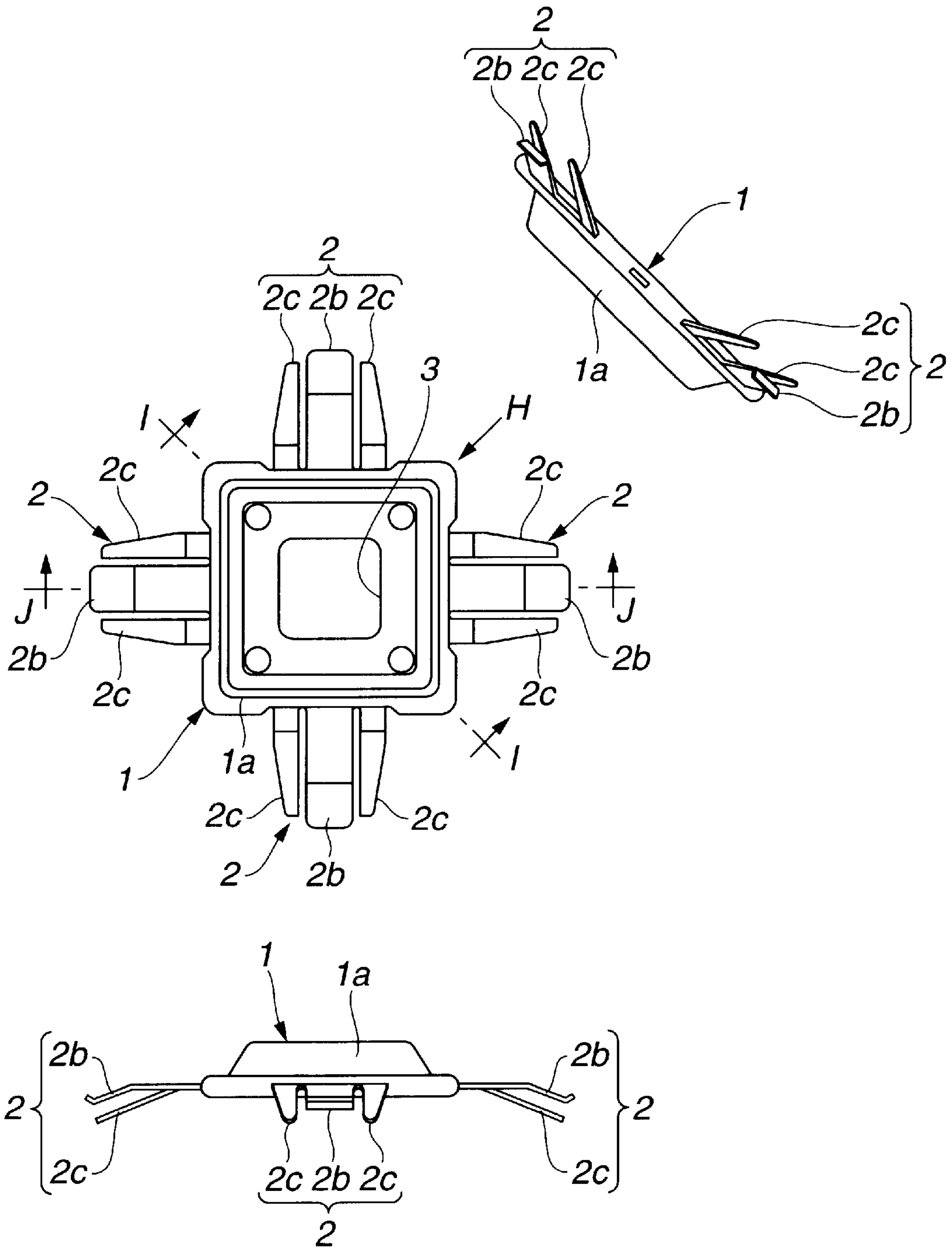
FIG. 4 is a front view of a tiltable member, including a front view and a section viewed from arrow H.
Figure 5:
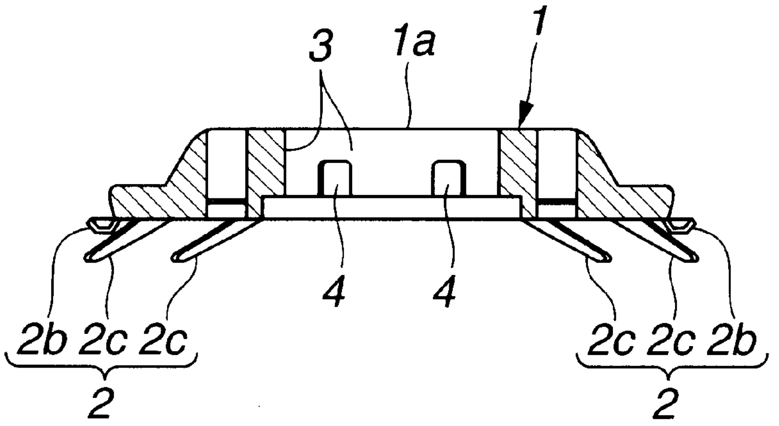
FIG. 5 is a fragmentary view illustrating the tiltable member taken along line I—I of FIG. 4.
Figure 6:
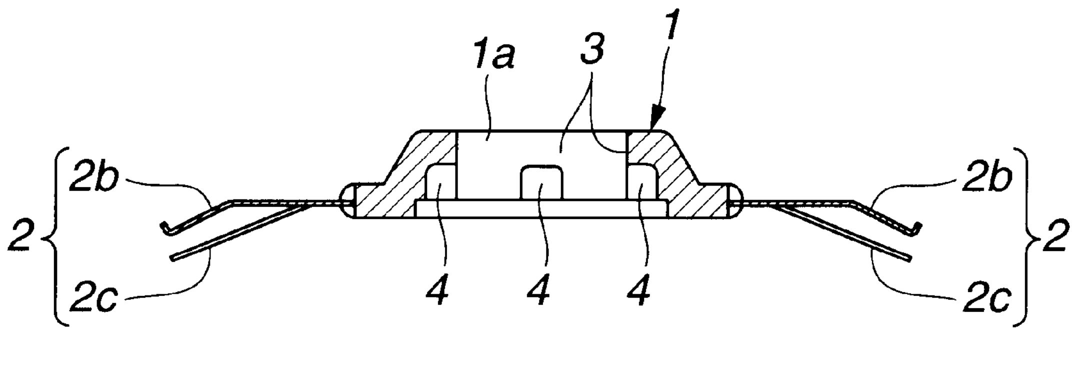
FIG. 6 is a fragmentary view illustrating the tiltable member taken along line J—J of FIG. 4.
Figure 7:
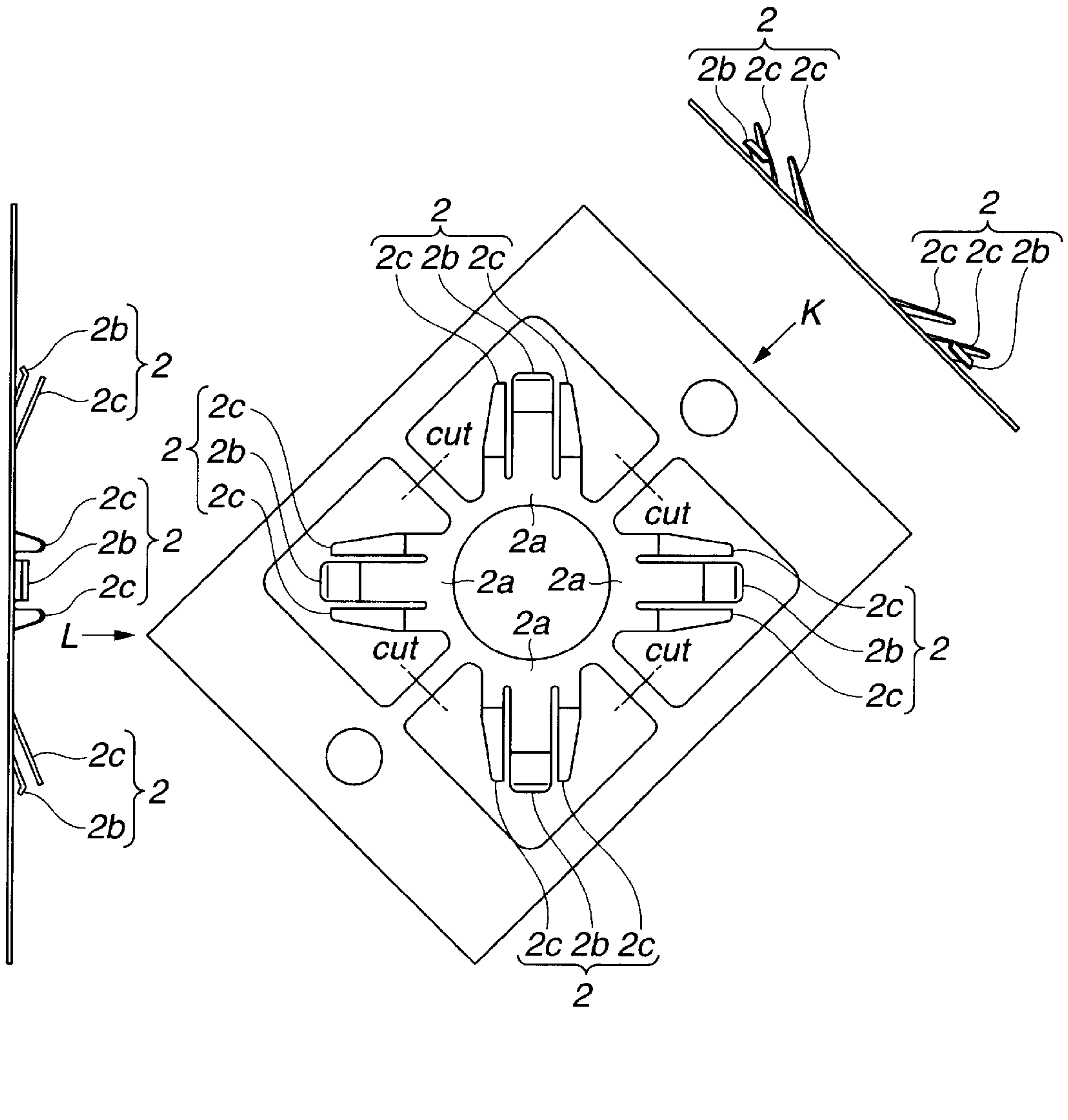
FIG. 7 is a plan view of a pattern plate of a contact resilient unit, including a section viewed from arrow K and a section viewed from arrow L.

Referring to FIGS. 1 to 3, a cover plate 13 covers the upper opening of the case 10. The cover plate 13 has a center hole 14 therein. The knob 8 of the control knob 5 protrudes upward from the center hole 14 in the cover plate 13. The cover plate 13 presses down the inner surface around the center hole 14 in the cover plate 13 against the peripheral portion of the tiltable body 1*a*, with the return spring pieces 2*b* biased.

Figure 15:
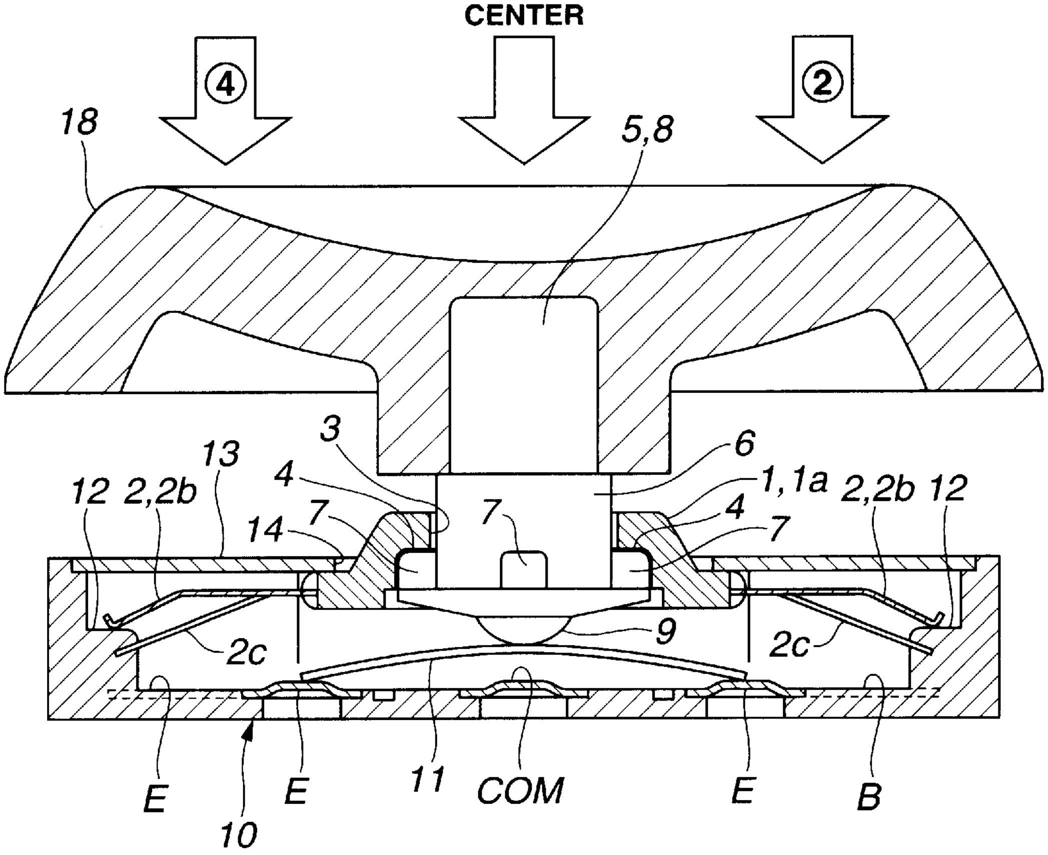
FIG. 15 is a cross-sectional view illustrating the four-way switch taken along line U—U of FIG. 1, in a normal state or in a restoring state.
Figure 16:
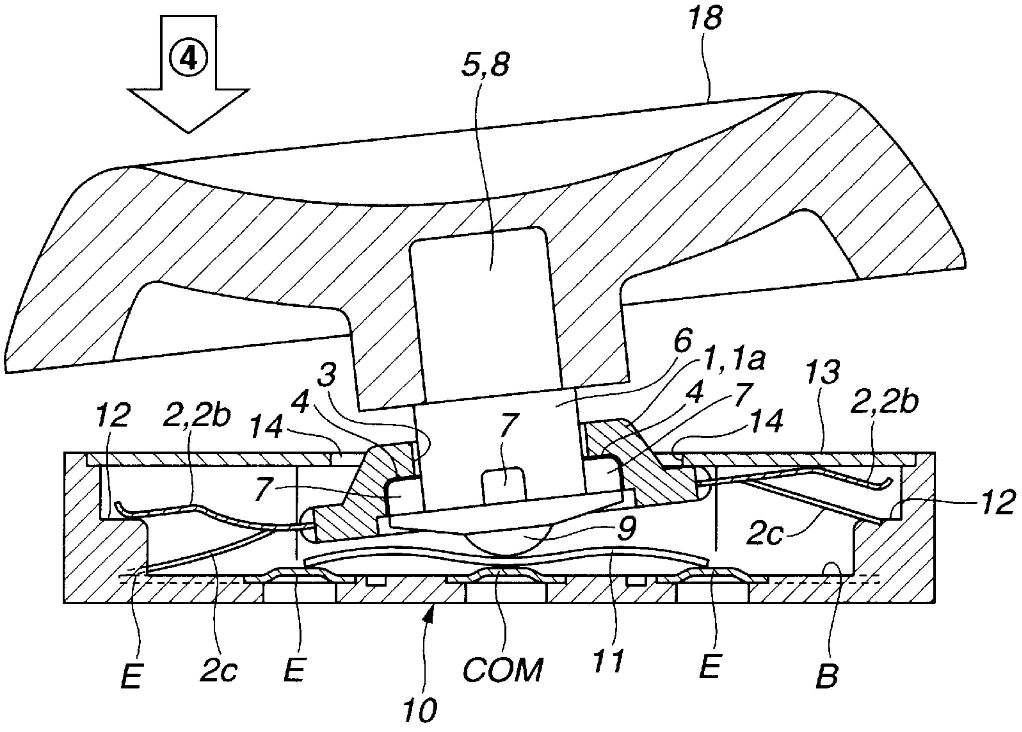
FIG. 16 is a diagram illustrating the handle (a control knob) shown in FIG. 15, tilted in the direction (4)

Referring to FIGS. 15 and 16, a handle 18 is attached to the knob 8 of the control knob 5 protruding upward from the cover plate 13. For example, the handle 18 is tilted in an intended direction (e.g. shown with the virtual line (4)). In this case, because the protruded portions 7 are engaged with the recessed portions 4, both the control knob 5 and the tiltable member 1 are tilted together against the restoring force of the return spring pieces 2*b* of the contact resilient unit 2 corresponding to the direction (4). When the ends of the contact spring pieces 2*c* and 2*c* are electrically contacted with corresponding stationary contacts D and E disposed on the upper surface of the base substrate, the switch S4 is turned on. When tilt of the knob 8 is released, the knob 8 returns to its original position by a restoring force of the return spring pieces 2*b*. Thus the switch S4 is turned off.

Therefore, the same switching function is applicable to the knob 8 tilted in the direction (1), (2) or (4).

Figure 17:
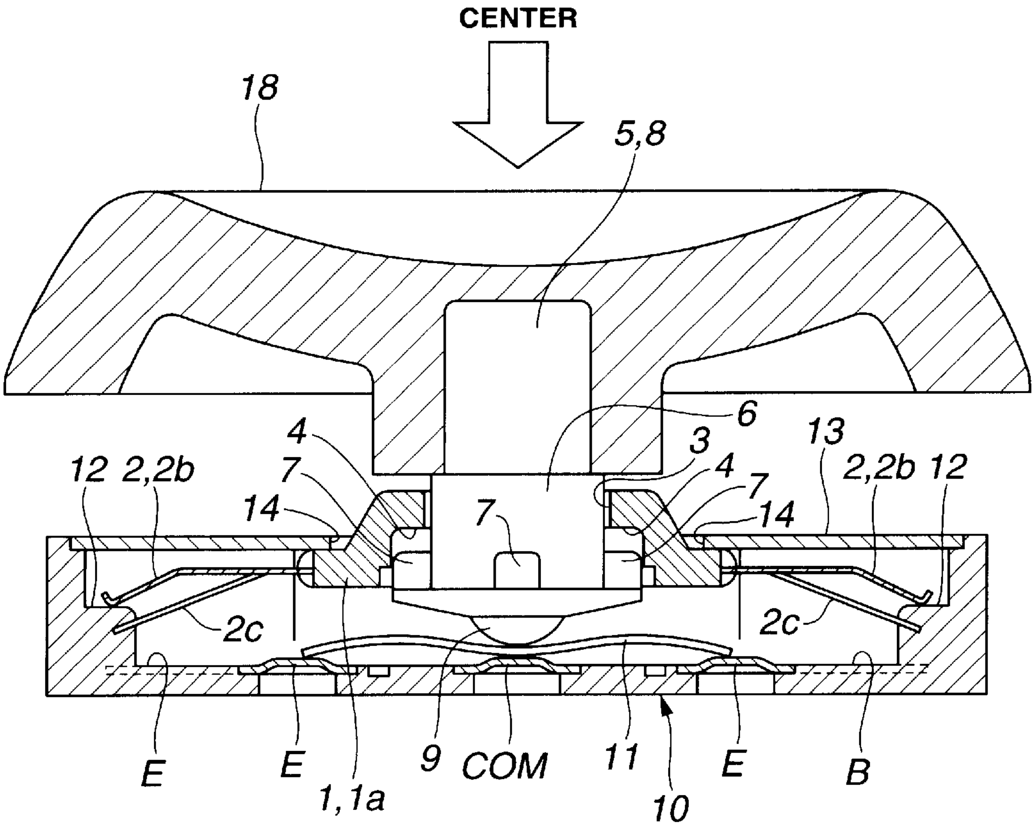
FIG. 17 is a diagram illustrating the handle (a control knob) shown in FIG. 15, vertically depressed.

Referring to FIG. 17, when the handle 18 is depressed vertically, only the control knob 5 slidably descends into the square opening 3 of the tiltable member 1. The bulge 9 depresses the center portion of the contact spring disc 11 so as to make connect with the center stationary contact COM. Thus, the stationary contacts E and COM are electrically conducted so that the switch S is turned off. When the knob 8 is released from its depression, the knob 8 returns to its original position by the restoring force of the contact spring disc 11. Thus the switch S is turned off.

The case 10, as shown in FIGS. 9 to 11, comprises a flat case of which one side opened. The stationary contacts A, B, C, D, E, and COM are embedded in the base substrate through insert molding fabrication so as to expose the upper surfaces of them. The terminals A, B, C, D, E, and COM for the stationary contacts A, B, C, D, E and COM protrude from the outer peripheral portion of the case.

Figure 12:
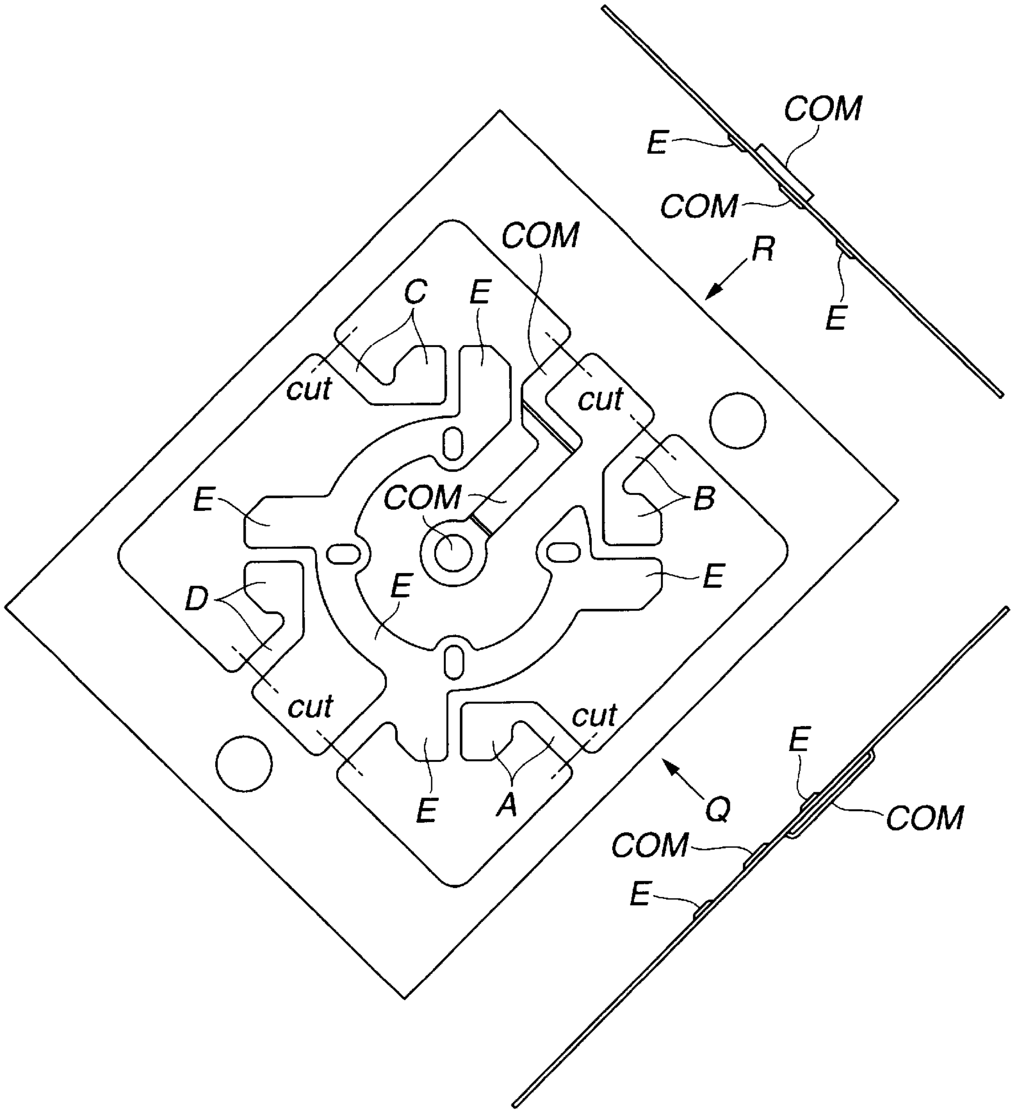
FIG. 12 is a plan view illustrating a stationary contact pattern plate, including a section viewed from arrow Q and a section viewed from arrow R.

As shown in FIGS. 9 and 12, the stationary contacts are exposed on the upper surface of the base substrate. The center stationary contact COM is disposed on the center of the case 10 so as to be spaced away from the center surface of the contact spring disc 11. The stationary contacts E are disposed on the surface of the case 10 so as to be contacted with the peripheral portion of the contact spring disc 11. The stationary contacts A and E, B and E, C and E, and D and E are disposed so as to be spaced away from the contact springs 2*c*, 2*c* protruding from the tiltable member 1 in four directions (corresponding to the virtual lines (1), (2), (3) and (4)).

Figure 13:
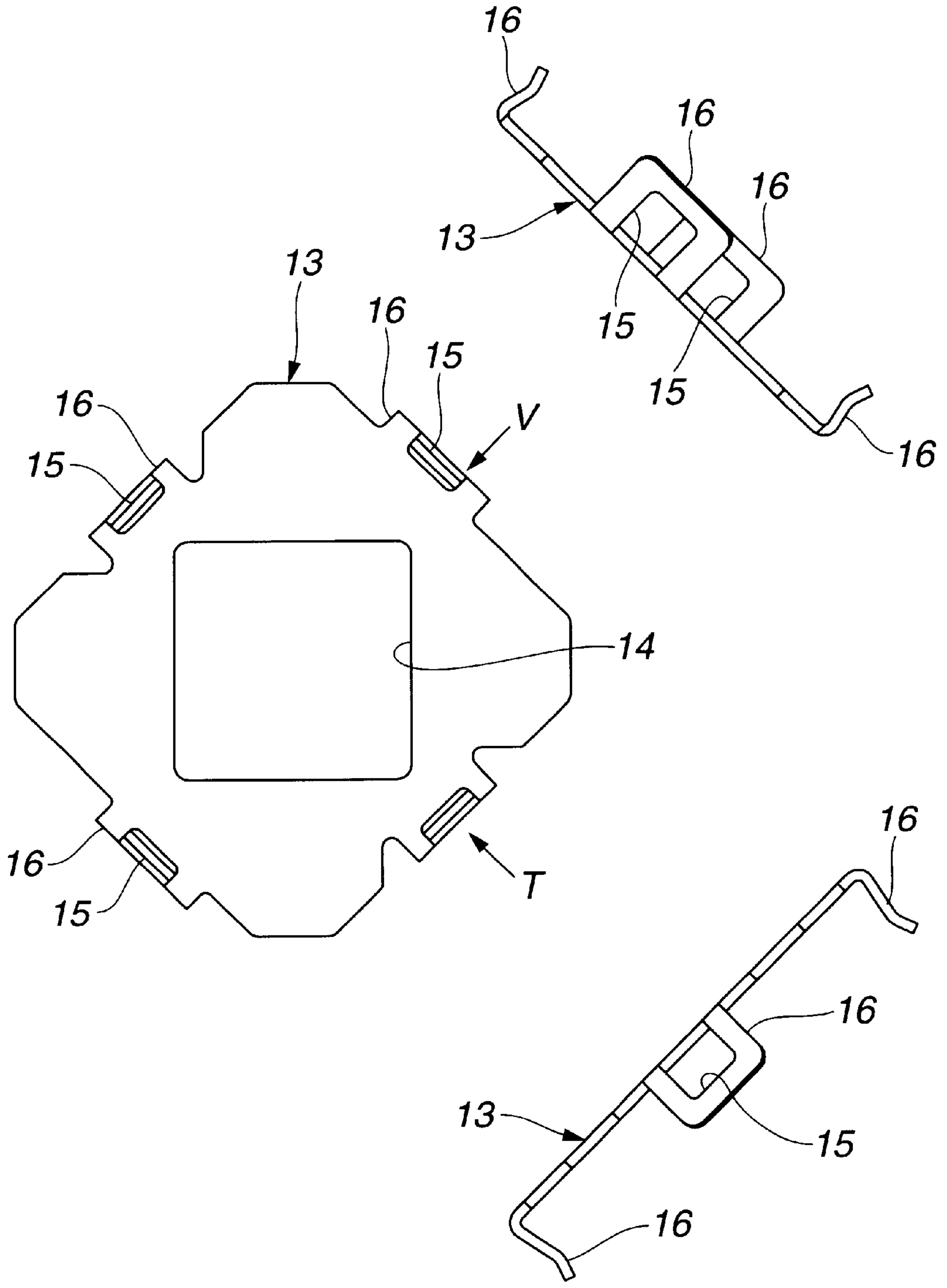
FIG. 13 is a plan view illustrating a cover plate, including a section viewed from arrow T and a section viewed from arrow V.
Figure 14:
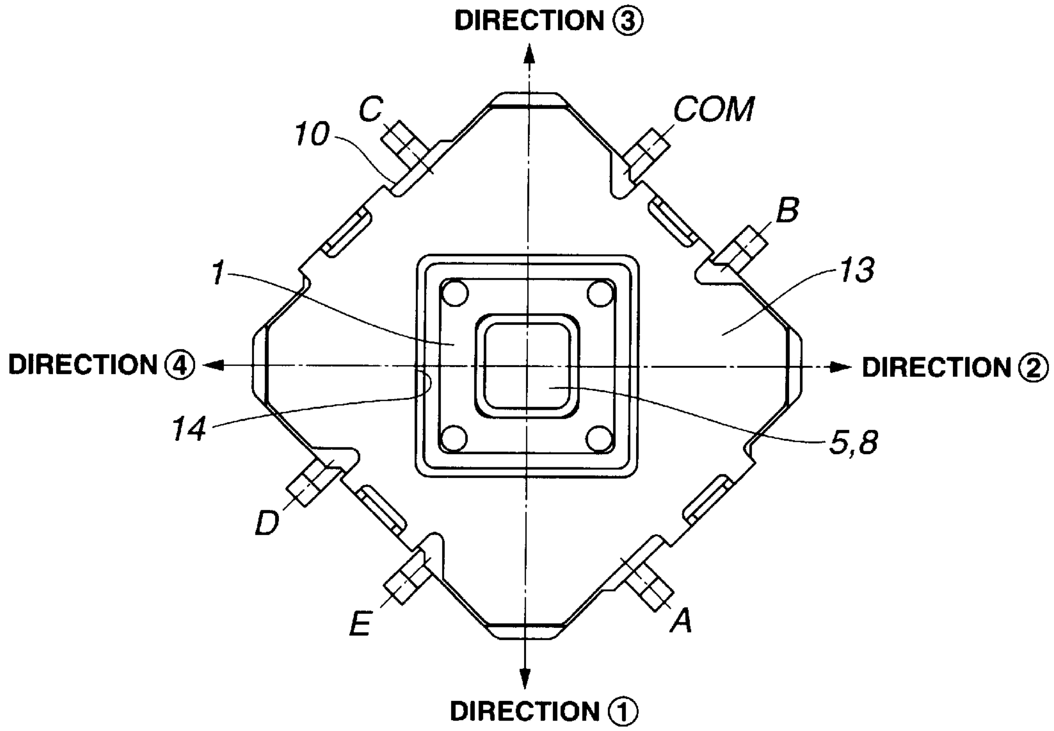
FIG. 14 is a plan view explaining the function of the switch shown in FIG. 1, including a circuit configuration table.

Referring to FIG. 13, the cover plate 13 has engaging pieces 16 with engaging holes 15, formed around the cover plate 13 and bent downward at right angle. The case 10 has engaging protrusions 17 formed on the outer peripheral surface thereof and at positions corresponding to the engaging holes 15 of the engaging pieces 16. Thus, the cover plate 13 is attached to the case 10 by engaging each engaging protrusion 17 to each corresponding engaging hole 15.

The contact resilient unit 2 comprises a base portion 2*a*, at least one return spring piece 2*b* protruding from said base portion 2*a*, and at least one contact spring piece 2*c*. As shown in FIGS. 4 to 6 and FIG. 7, the contact spring pieces 2*c*, 2*c* are arranged side by side and in parallel on the sides of the return spring piece 2*b* protruding from the base portion 2*a*. The tiltable member 1 with the contact resilient unit 2 is mounted inside the case 10. In such a state, each return spring piece is disposed on the spring rest 12 in the case 10 and the ends of a pair of contact spring pieces 2*c*, 2*c* are arranged so as to sandwich the spring rest 12.

By doing so, when the tiltable member 1 and the control knob 5 are tilted together, the tilt direction of the tiltable member 1 is restrictively guided, with the spring rest sandwiched by the ends of a pair of contact spring pieces 2*c*, 2*c*.

When adjustment of a restoring force or a click feeling is required, two contact spring discs 11 may be disposed in piles.

Switches S1, S2, S3 and S4 will be explained below by referring to FIGS. 15 and 16.

As shown in FIG. 16, when the handle 18 attached to the knob 8 is tilted in the direction (4), the tiltable member 1 and the contact resilient unit 2 are tilted together against the resilient force of the corresponding return spring pieces 2*b* of the contact resilient unit 2 because the protruded portions 7 of the control knob 5 and the recessed portions 7 of the tiltable member 1 are in an engaged state. The ends of the contact spring pieces 2*c* and 2*c* make electrical contact with the corresponding stationary contacts D and E on the upper surface of the base substrate, respectively. Thus, the switch S4 is turned on. When the tilt force to the knob 8 is released, the knob 8 returns to its original position by the restoring force of the return spring piece 2*b*. Thus, the switch S4 is turned off.

Similarly, when the handle 18 is tilted in the direction (1), (2) or (3), the same switching function can be performed.

As described above, both the control knob 5 and the tiltable member 1 are integrally tilted. This tilt movement may cause the bulge 9 to depress the center portion of the contact spring disc 11 so that the bulge 9 becomes contact with the center of the center common contact COM. Usually, this phenomenon does not cause electrical problems. If that phenomenon is unwanted, it is electrically set in such a way that signals from the common contact COM are not output or detected.

When the handle is tilted in an intended direction and depressed vertically, the turning point between the depression by the pushing force and the restoring function of the contact spring disc 11 is clearly perceived as a click feeling. Hence, discrimination between the tilt of the handle in a direction and the depression can be clearly sensed by fingertips.

The strength of the restoring force or the click feeling can be adjusted by laminating two or more contact spring discs or by changing the thickness of the contact spring disc.

As to the center switch S, when the handle 18 is depressed as shown in FIG. 17, only the control knob 5 slidably descends down into the square hole 3 of the tiltable member 1. The bulge 9 depresses the center portion of the contact spring disc 11 so that the center portion makes contact with the stationary contact COM. Thus, stationary contacts E and COM are electrically conducted so that the switch S is turned on. When the depression is released, the knob 8 returns to its original position by means of the restoring force of the contact spring disc 11 so that the switch S is turned off.

Figure 18:
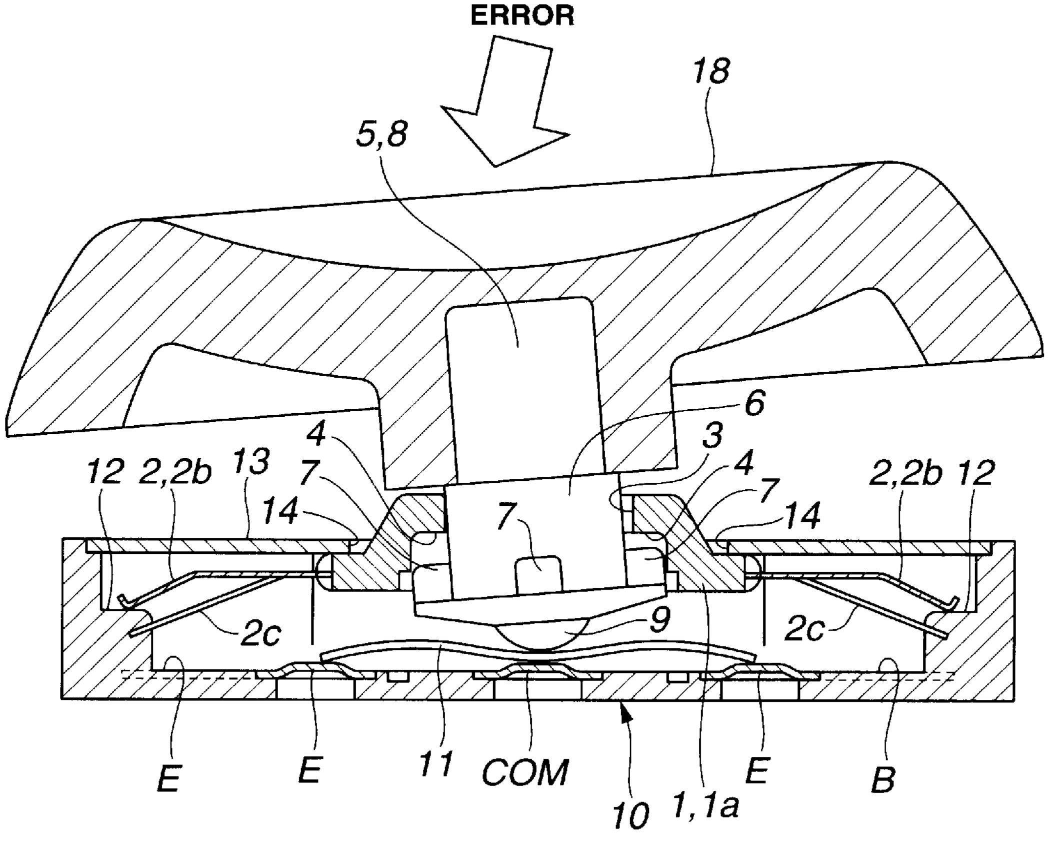
FIG. 18 is a diagram illustrating the handle (a control knob) shown in FIG. 15, erroneously depressed down in a slanting direction.
Figure 19:
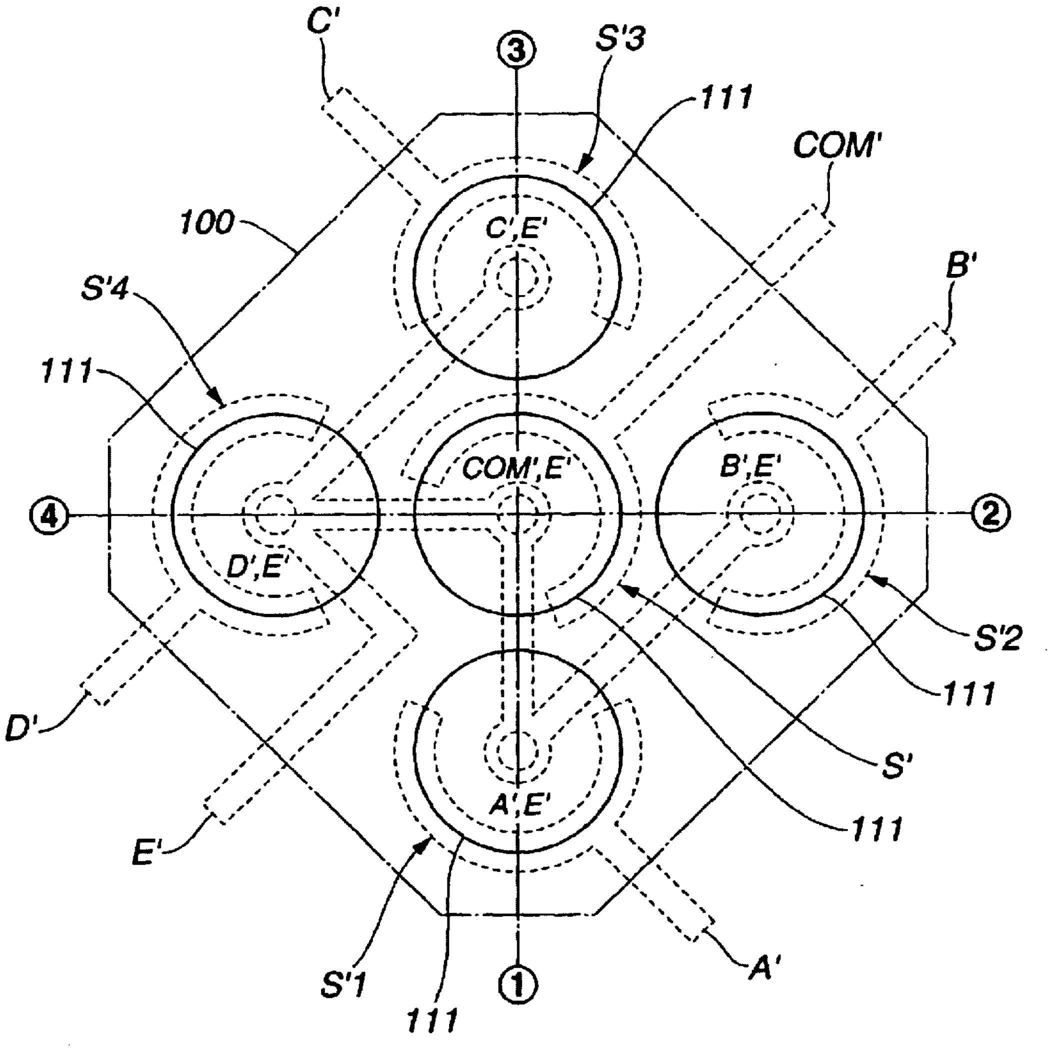
FIG. 19 is an enlarged plan view illustrating the configuration of a conventional four-way switch (where no tiltable member is shown).

As shown in FIG. 18, it may occur that the handle 18 is erroneously depressed in a slanting direction, or that the handle 18 is erroneously depressed while it is horizontally moved. In order to prevent such a problem, the tiltable member 1 and the control knob 2 are separately made and the protruded portion 7 is detachably engaged with the recessed portion. When the handle 18 is depressed (in a given direction), the recessed portion 4 is de-engage from the corresponding protruded portion 7. In such a de-engage state, tilting or horizontally moving the handle 18 does not adversely affect the tiltable member 1. In other words, because the tiltable member 1 does not tilt, the contact spring pieces do not erroneously touch with the corresponding stationary contacts.

Moreover, with the tiltable member 1 mounted inside the case 10, the ends of the contact spring pieces 2*c* and 2*c* of each contact resilient unit 2 are placed so as to sandwich the rest 12 on which the restoring piece 2*b* is placed. Therefore, when the tiltable member 1 tilts in an intended direction, the tilt direction thereof is restricted accurately while the spring rest 12 is sandwiched between the ends of the contact spring pieces 2*c* and 2*c*, so that the tiltable member 1 is guided to the tilt direction. (Refer to FIG. 1 and FIGS. 15 to 18)

As described above, according to the present invention, the contact spring disc, which is expense and is difficult in fabrication, stable installation, and maintenance, is used for only the center switch means, which is easy in stable installation and maintenance. In the four switch means disposed in the four directions, the movable contact means, formed of strip-like contact spring pieces and a strip-like return spring piece of the contact resilient unit made of a leaf spring, is used as the tiltable member. The leaf-spring made contact resilient unit is inexpensive, and can be easily designed and fabricated and accurately maintained at the mounting position. This structure allows the whole cost of the switch to reduce to a fraction of the cost of the conventional product. The present invention can provide a high-performance, high-durability four-way switch, compared with the conventional one.

The tiltable member and the control knob are separately fabricated. The recessed portions of the tiltable member and the protruded portions of the control knob are detachably engaged to each other. In operation, if the knob of the control knob may be erroneously depressed slantingly, or if the knob may be erroneously depressed down while it is moved horizontally, the recessed portions are de-engaged from the protruded portions through depression of the knob (in a given direction). In the de-engagement state, tilting and moving horizontally the knob does not adversely affect the tiltable member. That is, because the tiltable member does not tilt, the contact spring pieces are not erroneously contacted with the corresponding stationary contacts.

Moreover, with the tiltable member mounted inside the case, the ends of the contact spring pieces of each contact resilient unit are arranged so as to surround outside the rest 12 on which the return spring piece is placed. Therefore, when the tiltable member tilts in an intended direction, the tilt direction thereof is restricted to the intended direction with the ends of the contact spring pieces sandwiching sides of the spring rest, so that the tiltable member is accurately guided in the intended direction. This structure can prevent the control knob from being moved in an error direction.

Upon the tilt or depression of the handle, the turning point between the depression by pushing force and the restoring function of the contact spring disc disposed in the center of the switch is clearly perceived as a click feeling. Hence, discrimination between the tilt and depression movements can be clearly sensed by fingertips.

The strength of the restoring force or the click feeling can be arbitrarily adjusted by laminating two or more contact spring discs or by changing the thickness of the contact spring disc.

What is claimed is:

1. A four-way slide switch comprising:

a tiltable body formed of an insulating plate having a square opening in the center thereof, said tiltable body having recessed portions on the lower inner side in said square opening;

resilient contact units, each formed of a base portion of a conductive resilient plate from which return spring pieces and contact spring pieces are protruded out in parallel;

a tiltable member in which contact resilient units are embedded, said tiltable member having four peripheral sides each from which a set of a return spring piece and contact spring pieces is protruded out, the center of said opening of said tiltable body and the center of each of four sides of said square opening being aligned with the center of the base portion of each contact resilient unit;

a control knob having a shaft, protruded portions, a knob, and a bulge, said shaft being slidably inserted into said square opening of said tiltable member, said protruded portions being formed at the lower end of said shaft and being detachably engaged in said recessed portions of said tiltable body, said knob extending upward from said shaft, said bulge being protruded from the center of the lower end of said shaft;

a contact spring disc inserted into the center of a case, the fringe of said contact spring disc being disposed so as to contact with stationary contacts formed on the upper surface of said case, the center portion of said contact spring disc confronting a center stationary contact formed on the upper surface of said case;

wherein said shaft of said control knob is inserted into the opening in said tiltable member; the structure in which said protruded portions and said recessed portions are engaged to each other is disposed inside said case; the center of the bulge of said control knob is aligned with the center of the upper surface of said contact spring disc; said return spring pieces are respectively placed on spring rests formed inside said case; and said contact spring pieces are respectively disposed over stationary contacts on the upper surface so as to be spaced away from each other; and a cover plate for covering the upper opening of said case, said cover plate having a center hole therein, the knob of said control knob protruding upward from the center hole of said cover plate, said cover plate pressing the inner surface around said center hole against the peripheral portion of said tiltable body, with said return spring pieces biased;

wherein when said knob of said control knob is tilted in an intended direction, said control knob and said tiltable member are tilted together against the restoring force of said return spring pieces of a corresponding resilient unit so that the ends of said contact spring pieces are electrically contacted with corresponding stationary contacts disposed on the upper surface of the base substrate of said case;

wherein when tilt of said knob is released, said knob returns to its original position by a restoring force of said return spring pieces;

wherein when said knob of said control knob is depressed, only said control knob slidably descends into said square opening of said tiltable member, so that the bulge of said control knob depresses the center portion of said contact spring disc and thus electrically connects said center portion thereof to the center stationary contact;

wherein when said knob is released from its depression, said knob returns to its original position by a restoring force of said contact spring disc.

2. The four-way switch defined in claim 1, wherein said case comprises a flat case of which one side is opened, said case including a base substrate in which stationary contacts are embedded through insert molding fabrication, and terminals for said stationary contacts protruding from the outer peripheral portion of said case; and wherein said stationary contacts are exposed on the upper surface of said base substrate, said stationary contacts comprising a center stationary contact disposed on the center of said case so as to be spaced away from the center surface of said contact spring disc, stationary contacts disposed so as to be contacted with the peripheral portion of said contact spring disc, and stationary contacts disposed so as to be spaced away from said contact springs protruding in four directions from said tiltable member.

3. The four-way switch defined in claim 1, wherein said cover plate comprises engaging pieces with engaging holes, formed around said cover plate and bent downward at right angle, and wherein said case comprises engaging protrusions formed on the outer peripheral surface thereof and at positions corresponding to said engaging holes of said engaging pieces, whereby said cover plated is attached to said case by engaging each engaging protrusion to each corresponding engaging hole.

4. The four-way switch defined in claim 1, wherein said contact resilient unit comprises a base portion, at least one return spring piece protruding from said base portion and at least one contact spring piece, said contact spring pieces being arranged side by side and in parallel to the sides of said return spring piece; said tiltable member with said contact resilient unit being mounted inside said case, in such a way that each return spring piece is disposed on a spring rest in said case and that the ends of a pair of contact spring pieces are arranged so as to sandwich said spring rest;

whereby when said tiltable member and said control knob are tilted cooperatively, the tilt direction of said tiltable member is restricted, with said spring rest sandwiched by the ends of said contact spring pieces, so that said tiltable member is guided to the tilt direction.

* * * * *

UNITED STATES PATENT AND TRADEMARK OFFICE

CERTIFICATE OF CORRECTION

PATENT NO. : 6,657,141 B1
DATED : December 2, 2003
INVENTOR(S) : Myojin

It is certified that error appears in the above-identified patent and that said Letters Patent is hereby corrected as shown below:

Column 4,
Lines 18, 21 and 29, "1a" should be -- 1a --

Column 7,
Lines 6 and 8, "de-engage" should be -- de-engaged --

Signed and Sealed this

Thirty-first Day of August, 2004

JON W. DUDAS
*Director of the United States Patent and Trademark Office*